Patented Aug. 8, 1933

1,921,857

UNITED STATES PATENT OFFICE 1,921,857

COLOR LAKES

Bodo Zschimmer and Franz Pohl, Ludwigshafen-on-the-Rhine, Germany, assignors to I. G. Farbenindustrie Aktiengesellschaft, Frankfort-on-the-Main, Germany No Drawing. Application May 27, 1930, Serial No. 456,287, and in Germany May 31, 1929

9 Claims. (Cl. 260—11)

The present invention relates to the production of color lakes from basic dyestuffs and complex acids.

We have found that in the manufacture and production of color lakes from basic dystuffs which may also contain acid groups by conversion with complex acids, valuable color lakes which in particular have a very high fastness to light and very great strength of color are obtained by precipitating the basic dyestuffs by means of solutions of the complex acids having a hydrogen ion concentration which is smaller that that of a corresponding solution of the acid salts but higher than pH=7. The hydrogen ion concentration of the said solutions may be adjusted to the aforesaid value by adding definite amounts of basic substances to the solutions of the complex acids or their acid salts, or by the addition of appropriate amounts of an acid to solutions of salts of the said acids having too small a content of hydrogen ions. The value of hydrogen ion concentration within the stated limits which is most favorable for the formation of lakes having special fastness to light and strength of color, varies with the single dyestuffs. The optimum value of the hydrogen ion concentration depends also to a great extent on the working conditions, in particular on the concentration of the components, the temperatures and the like. The best value can, however, easily be ascertained by those skilled in the art to which the present invention relates.

Complex acids of molybdenum are preferably employed and especially those comprising phosphorus, but the phosphorus may also be replaced by silicon, antimony, boron, chromium, aluminium, arsenic and the like. The molybdenum may also partially be replaced by tungsten and these compounded complex acids give particularly good results. A great variety of basic substances may be used for the purpose of our invention and it is not essential whether the basic substances are soluble in water or not; thus caustic alkalies, salts thereof with weak acids, for example the carbonates, acetates and the like, aluminium hydroxide, calcium hydroxide or calcium carbonate may be used.

Frequently it is preferable to add an acid other than the complex acids to the basic dyestuffs to be converted or to subject the already precipitated complex lakes to an after-treatment with such an acid. This treatment with an acid other than the complex acid used for precipitation will be referred to in the appended claims for the sake of simplicity of language as "treating with another acid at any stage of the process". Strong acids are preferably used for the said latter purpose, such as for example hydrochloric acid, sulphuric acid or a chloracetic acid and the like.

In the manner of working hereinbefore described it is not necessary to start from the prepared free complex acids or their acid salts and to partly neutralize these with agents having a basic action. Generally speaking it is sufficient if care be taken in the preparation of the complex acids or their acid salts that a sufficiently large proportion of basic substances is combined with the complex acids to adjust the hydrogen ion concentration of the solution to the value above defined.

Working at elevated temperatures is frequently particularly favorable and sometimes the employment of increased pressures as a rule up to 3 atmospheres is advantageous. In many cases it is also advantageous to subject the precipitated lakes to an aftertreatment with acids or salts which are capable of forming complexes with the complex acids already present in the color lakes. Thus the basic dyestuffs may be precipitated by means of a complex phosphomolybdic or phosphotungstic acid which has been neutralized to the above defined extent, and the precipitated color lake afterwards treated with a tungstate or molybdate respectively.

The following examples will further illustrate the nature of this invention but the invention is not restricted to these examples. The parts are by weight.

Example 1

200 parts of Rhodamine 3G extra (Schultz, Farbstofftabellen 1923, No. 576) are dissolved in 200 times the amount of water and are precipitated at 45° centigrade with an aqueous solution of 440 parts of the acid salt of phosphotungsticmolybdic acid (1:10) which has been neutralized with caustic soda solution until the solution has a pH value of 3.8. 15 parts by volume of hydrochloric acid of 20° Baumé (diluted 1:10) are then added and the mixture is then boiled for half an hour. In this manner a color lake is obtained which is fast to light and which has great strength of color.

A color lake which likewise is fast to light and has a great strength of color may be obtained by working at a pH value of about 5. Other agents having a basic action, as for example sodium acetate, aluminium hydroxide and the like may be employed for neutralizing the complex compounds, instead of caustic soda solution.

Likewise, alkali blue 4R (Schultz, Farbstofftabellen 1923, No. 536) or light green SF (Schultz, Farbstofftabellen 1923, No. 504) may be employed instead of the dyestuff specified in this example.

Example 2

120 parts of the acid salt of phospho-tungstic-molybdic acid are dissolved in 1200 parts of water and neutralized with caustic soda solution until it has a pH value of about 2.8. This solution is then added to a solution, at 50° centigrade, of 54 parts of Rhodamine 3B (Schultz, Farbstofftabellen 1923, No. 574) in 6000 parts of water and 6 parts of concentrated hydrochloric acid. The whole is boiled for some time, diluted with water and worked up in the usual manner. The red lake thus prepared has great strength of color and fastness to light.

Example 3

100 parts of Setocyanine O (Schultz, Farbstofftabellen 1923, No. 500) dissolved in three hundred times the amount of water are precipitated at 50° centigrade with a solution of 104 parts of sodium tungstate and 24 parts of disodium phosphate in 1800 parts of water and 40 parts by volume of hydrochloric acid of 20° Baumé strength, which has been left standing until it has attained a constant pH value of 6.8. A 10 per cent solution of 90 parts of ammonium molybdate is then added and the whole is acidified with 35 parts by volume of hydrochloric acid of 20° Baumé strength. The mixture is boiled for half an hour.

The corresponding quantity of sodium molybdate may be employed instead of the ammonium molybdate. Likewise it is possible not to add all of the phosphate to the sodium tungstate solution but to add part thereof later in combination with the ammonium or sodium molybdate.

Example 4

39.2 parts of tungstic acid and 6 parts of molybdic acid are dissolved hot in 57 parts of caustic soda of 40° Baumé strength and a little water. 10.5 parts of disodium phosphate are added to this solution which is then acidified with 50 parts of concentrated hydrochloric acid and heated for some time. The complex salt solution is treated with so much of a caustic soda solution until it has a pH value of about 2.5. This solution is then allowed to flow into a solution of 35 parts of diamond green G (Schultz, Farbstofftabellen 1923, No. 499) dissolved in 3000 parts of water and 2 parts of hydrochloric acid. The whole is boiled for some time, diluted with water, filtered and worked up in the usual manner.

A green color lake is obtained having great strength of color and fastness to light.

What we claim is:—

1. A process for the production of color lakes of basic dyestuffs, which comprises precipitating the basic dyestuff by means of a salt of a complex acid comprising in its anion an element selected from the class consisting of tungsten and molybdenum, said solution having a hydrogen ion concentration which is smaller than that of a corresponding solution of the acid salt of the said complex acid but higher than pH=7.

2. A process for the production of color lakes of basic dyestuffs, which comprises precipitating the basic dyestuff by means of a salt of a complex acid comprising in its anion an element selected from the class consisting of tungsten and molybdenum, said solution having a hydrogen ion concentration which is smaller than that of a corresponding solution of the acid salt of the said complex acid but higher than pH=7, and treating with another acid at any stage of the process.

3. A process for the production of color lakes of basic dyestuffs, which comprises precipitating the basic dyestuff by means of a solution of a salt of a complex molybdic acid having a hydrogen ion concentration which is smaller than that of a corresponding solution of the acid salt of the said complex acid but higher than pH=7.

4. A process for the production of color lakes of basic dyestuffs, which comprises precipitating the basic dyestuff by means of a solution of a salt of a complex molybdic acid having a hydrogen ion concentration which is smaller than that of a corresponding solution of the acid salt of the said complex acid but higher than pH=7, and treating with another acid at any stage of the process.

5. A process for the production of color lakes of basic dyestuffs, which comprises precipitating the basic dyestuff by means of a solution of a salt of a complex phosphomolybdic acid having a hydrogen ion concentration which is smaller than that of a corresponding solution of the acid salt of the said complex acid but higher than pH=7.

6. A process for the production of color lakes of basic dyestuffs, which comprises precipitating the basic dyestuff by means of a solution of a salt of a complex phosphotungsticmolybdic acid having a hydrogen ion concentration which is smaller than that of a corresponding solution of the acid salt of the said complex acid but higher than pH=7.

7. A process for the production of color lakes of basic dyestuffs, which comprises precipitating the basic dyestuff by means of a solution of a salt of a complex phosphotungsticmolybdic acid having a hydrogen ion concentration which is smaller than that of a corresponding solution of the acid salt of the said complex acid but higher than pH=7, and treating with another acid at any stage of the process.

8. A process for producing color lakes of basic dyestuffs which comprises precipitating said dyestuffs with a solution of a complex salt containing in its anion an element selected from the class consisting of tungsten and molybdenum together with another element selected from the class consisting of phosphorus, silicon, antimony, boron, chromium, aluminum and arsenic, said solution having a pH ranging from 2.5 to 6.8.

9. A process as defined in claim 8 wherein the precipitation is effected at a temperature of about 40 to 50° C.

BODO ZSCHIMMER.
FRANZ POHL.